March 22, 1966 C. D. SHAFFER 3,241,864
AUTOMATIC CONNECTOR
Filed Oct. 29, 1962 3 Sheets-Sheet 1
FIG. 1.
FIG. 2.
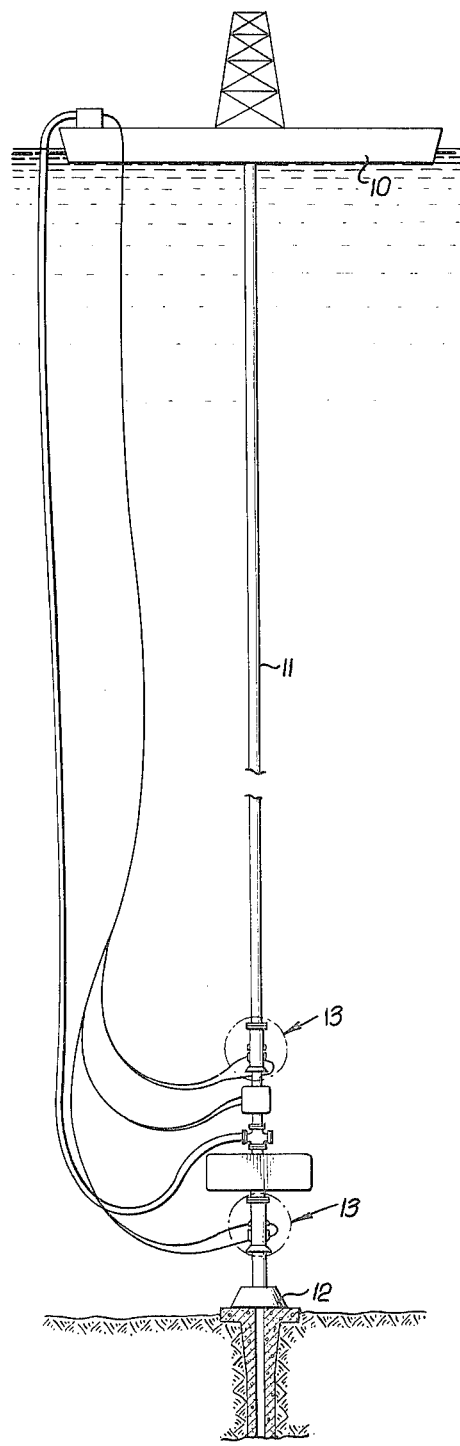
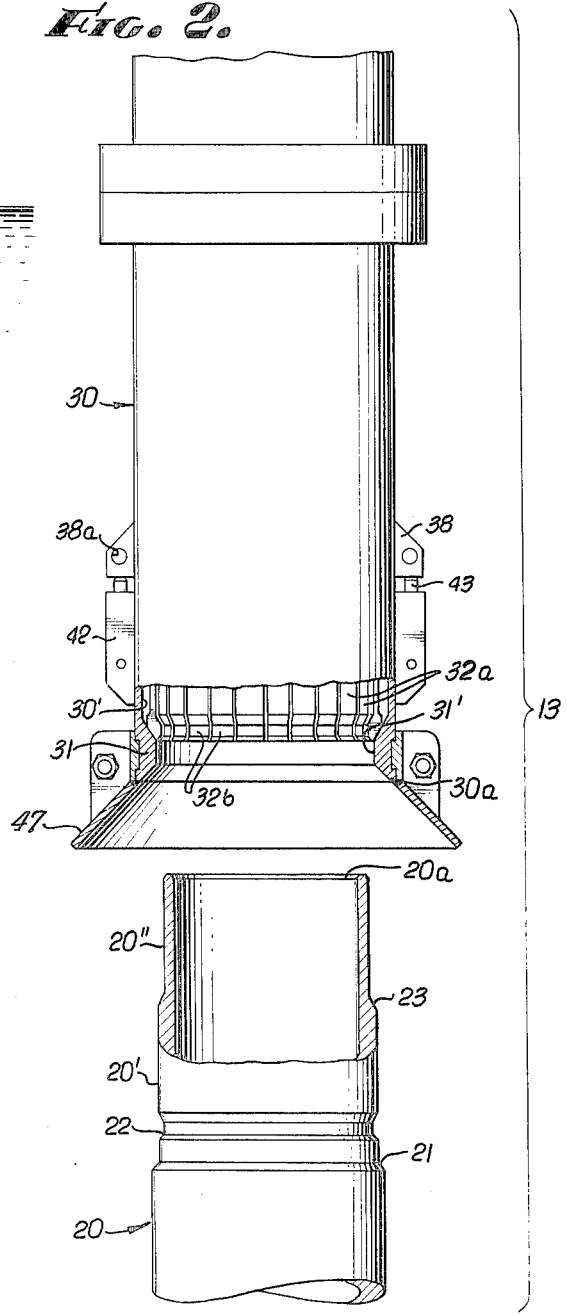
INVENTOR.
CHARLES D. SHAFFER
BY
Miketta and Glenny
ATTORNEYS.

March 22, 1966

C. D. SHAFFER 3,241,864

AUTOMATIC CONNECTOR

Filed Oct. 29, 1962

INVENTOR.
CHARLES D. SHAFFER
BY
Miketta and Glenny
ATTORNEYS.

March 22, 1966 C. D. SHAFFER 3,241,864
AUTOMATIC CONNECTOR
Filed Oct. 29, 1962 3 Sheets-Sheet 3
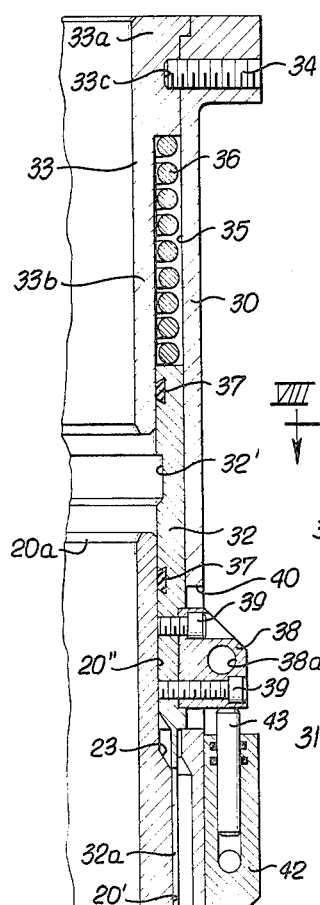
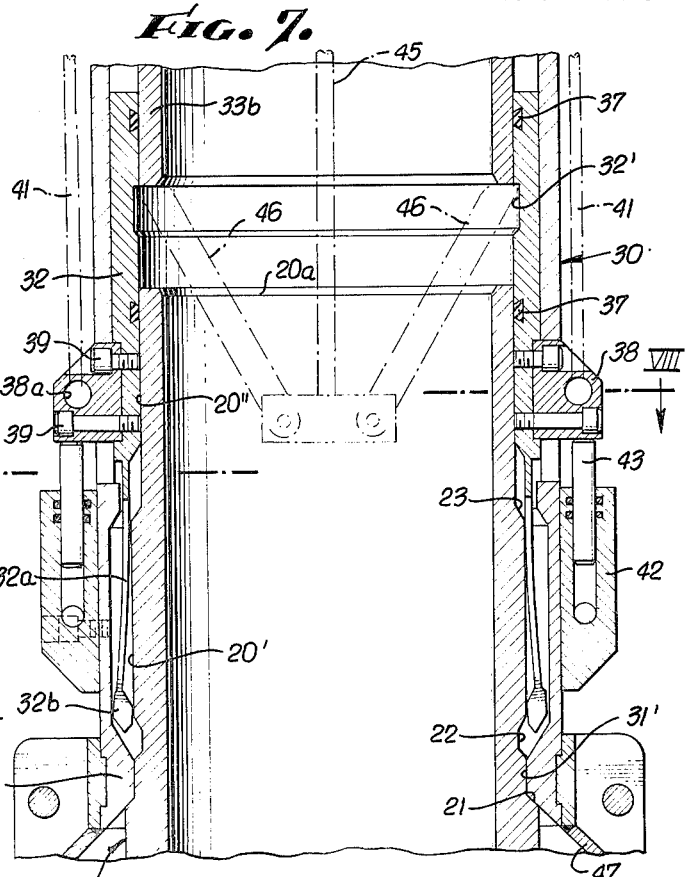
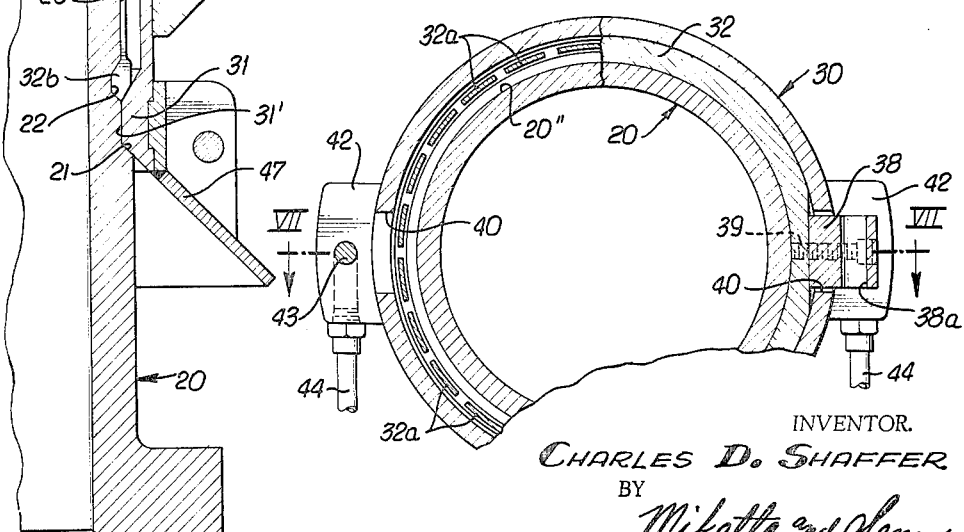
INVENTOR.
CHARLES D. SHAFFER
BY
Miketta and Glenny
ATTORNEYS.

United States Patent Office 3,241,864
Patented Mar. 22, 1966

3,241,864
AUTOMATIC CONNECTOR
Charles D. Shaffer, Brea, Calif., assignor to Shaffer Tool Works, Brea, Calif., a corporation of California
Filed Oct. 29, 1962, Ser. No. 233,704
3 Claims. (Cl. 285—18)

The present invention relates to an automatic connector for well-drilling equipment and in particular to an automatic connector for oil-well drilling, casing and cementing strings.

There is and will be a continuing demand and need in the oil industry for developing the offshore oil areas. Sub-sea drilling presents many new operational and porcedural problems not normally encountered in the more conventional onshore drilling procedures. For example, additional equipment such as anchoring assemblies, pressure control equipment are required to be lowered to the sea floor prior to drilling. The sub-sea drilling procedure could not be performed and the necessary equipment assembled without a connector which enabled the many pieces of equipment required in a drilling string to be quickly and easily connected and disconnected during the assembly operation. Moreover, when emergencies arise, as when a storm occurs, the drill string must be quickly disconnected from the floating vessel to prevent damage.

Various types of connectors have been used heretofore but each such connector required the rotation of the drill string or of elements or parts in the connector sub or joint before connection or disconnection was made. In addition, the connectors included rigid, inwardly extending keys or lugs which were adapted to cooperate with helically curved or inclined slots or recesses for latching the mandrel and barrel elements of the connector together. Undue torque or stress was therefore likely to be imparted to the drill string or the smaller locking elements such as rigid keys, lugs and stop shoulders of those connectors. After repeated use, these elements were adapted to wear and complementary and mating locking surfaces on such elements would not cooperate or function in the manner for which designed.

The connector of the present invention completely obviates the disadvantages of those connectors described above. The present connector is automatically connected and disconnected without rotation of the drill string or of driving lugs or keys turning or rotating into and out of channels and slots. The operation of the connector of the present invention is simple, quick, positive and completely automatic. Longitudinal or vertical pull or strain on the drill string only tends to further lock the connector and prevent release or disconnection. The connector will not release under rotational loads, from either direction, nor under vertical loads.

Moreover, the present invention may also be used as a safety joint in a drill string in order to disconnect that section of pipe above a stuck or frozen or jammed pipe section. Again, the drill string need not be rotated nor is any of the elements of the connector required to be rotated in order to effect a release. The locking means of the present connector is disconnected or released in a positive manner and is not required to be loaded with compression and tension loads in order to effect a release as was necessary in the friction slips and sleeves of safety joints used heretofore.

The present connector invention includes a hollow mandrel telescopically received and adapted to be locked within a hollow barrel member, locking means carried by the barrel for locking the mandrel and barrel together, retaining means for preventing the locking means from disconnecting or releasing the barrel and mandrel elements, and unlocking means for moving the locking means away from the retaining means and for releasing the barrel from the mandrel. The locking means includes outwardly expandable locking heads adapted to be lockingly received in a groove in said mandrel. There are no driving keys or lugs adapted to be rotated or turned into and out of slots in order to connect and release. Only a simple, straight upwardly or downwardly axial force is needed to operate this connector.

Accordingly, it is a general object of the present invention to provide a connector for well-drilling equipment that avoids all of the foregoing disadvantages of similar type connectors used heretofore.

An object is to provide a connector for well-drilling equipment which is automatically connected or latched.

Another object is to provide a connector for well-drilling equipment which is adapted to be connected and released without rotation or torque applied thereto or to any elements or parts therein.

A further object is to provide a connector which is simply and quickly connected and released and cannot be released by torque, pulls or rotational loads applied thereto.

An object is to provide a connector for well-drilling equipment which cannot be released or disconnected when subject to torque, tension or compression loads.

Another object is to provide a connector for well-drilling equipment which has a minimum number of parts, is inexpensive to manufacture, and requires no maintenance.

Other objects and advantages of this invention will be readily apparent from the following description when considered in connection with the appended drawings.

In the drawings:

FIG. 1 is a side elevation diagrammatically illustrating an exemplary offshore oil well drilling rig indicating one possible application or use for the connector of the present invention. An exemplary connector device of the present invention is shown enclosed within the phantom circle lines in such drilling rig.

FIG. 2 is an enlarged elevation, partly in longitudinal section, of an exemplary connector device of the present invention with the mandrel and barrel elements of such connector being unconnected and spaced from each other.

Figure 3:
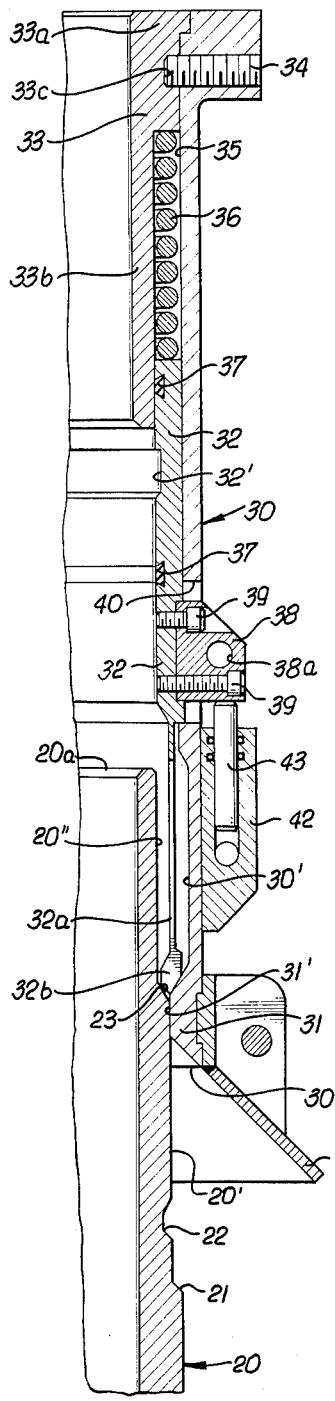
Figure 4:
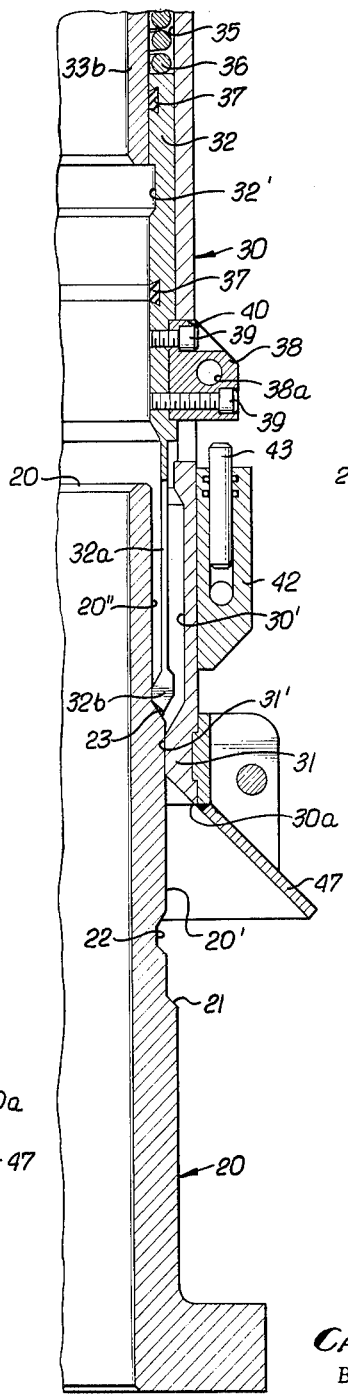
Figure 5:
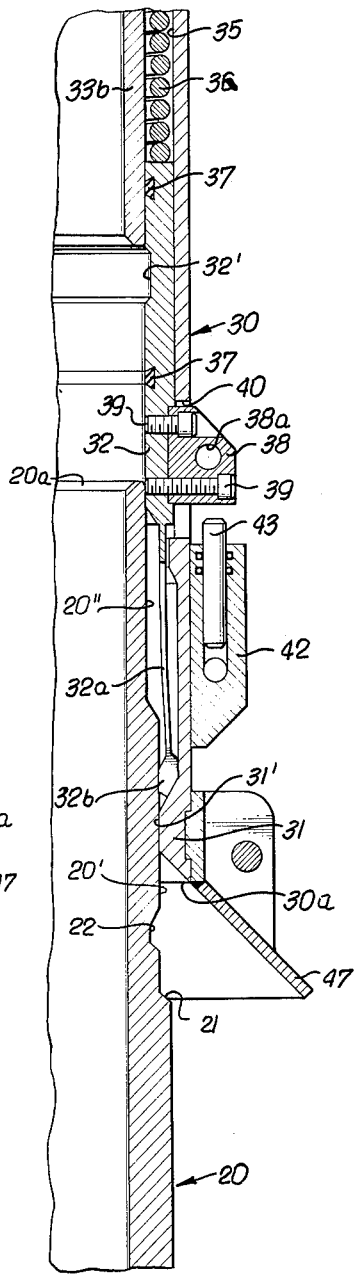

FIGS. 3, 4, 5 and 6 are enlarged, longitudinal elevation views, primarily in section of the device in different, successive, sequential positions assumed during connection and disconnection of the mandrel and barrel, wherein FIG. 3 illustrates the first step of the connection, FIG. 4 illustrates the second step of connection, FIG. 5 illustrates the third step of connection, and FIG. 6 illustrates the mandrel and barrel of the device in the connected or locked position.

FIG. 7 is a longitudinal section of the device taken along the plane of VII—VII of FIG. 8, wherein the mandrel and barrel are connected, different means for disconnecting the device being shown in phantom lines.

FIG. 8 is a transverse elevation view of the device taken along the plane of VII—VII of FIG. 7.

Referring now to the drawings, wherein like reference characters designate like or corresponding parts throughout the several views, there is shown in FIG. 1 an exemplary offshore oil well drilling rig in which the connector of the present invention may be used. In the floating-vessel approach to offshore oil development, a barge 10 may be used as a floating base from which a string of drilling equipment 11 extends downwardly to an anchoring assembly 12. Included in such string of drilling equipment 11 may be one or more automatic connectors 13 (shown in phantom circle lines) which are indispensable in such offshore drilling operations.

An exemplary automatic connector 13 of the present invention is shown in FIG. 2 in a disconnected position and includes an inner, hollow mandrel 20 having one end 20a slidably received and adapted to be automatically and releasably connected in one end 30a of an elongated, hollow, outer barrel member 30 without rotation of the drilling equipment connected thereto or of any elements of the mandrel and barrel members. It is understood that the other ends of the mandrel 20 and barrel member 30 may be connected by threaded pins, clamping rings, or bolted connections to casing, drill pipe, a drilling tool, fishing tool, blowout preventers, and other various types of sub-assemblies for drilling and production equipment.

The end portion 20a of the hollow mandrel 20 has a smooth outer cylindrical surface 20' and a stop shoulder 21 projecting outwardly from the outer cylindrical surface 20' and spaced from the end 20a of the mandrel 20. The stop shoulder 21 is adapted to be contacted by the end 30a of the barrel 30 to limit further movement of the barrel 30 beyond the stop shoulder 21 when the barrel and mandrel are connected.

Spaced between the end 20a of the mandrel 20 and the barrel stop shoulder 21, there is provided in the cylindrical surface 20' an outwardly facing circumferential locking groove 22 adapted to receive locking means carried by the barrel 30. The locking groove 22 may have inclined side wall surfaces to aid the locking means from moving into and out of locking engagement with the locking groove 22.

Adjacent the extreme end of mandrel 20, the diameter of the mandrel outer surface 20'' may be slightly less than the diameter of the outer mandrel surface 20' in which locking groove 22 is located. A downwardly and outwardly inclined shoulder 23 separates the larger and smaller diameter mandrel surfaces 20' and 20''. The smaller diameter outer mandrel surface 20'' may function as a guiding surface for the barrel end portion 30a during connection of the device and may slidingly contact and support a portion of the locking means carried by the barrel 30.

The hollow barrel member 30 has an end portion 30a adapted to telescopically receive and be releasably connected with the end portion 20a of the mandrel 20. The mandrel end portion 20a is adapted to extend into the hollow barrel end portion 30a until the stop shoulder 21 is contacted by the barrel end portion 30a, at which point the locking means for the device 13 will be in proper alignment with the locking groove 22 to lock and connect the mandrel and barrel together.

The hollow barrel 30 is provided with a smooth inner cylindrical surface 30' having a diameter greater than the diameter of the outer surface 20' of the mandrel 20. Adjacent the barrel end portion 30a and on the inner cylindrical barrel surface 30' may be provided an inwardly extending circumferential locking ring 31. The inner cylindrical surface 31' of the locking ring 31 has a diameter substantially equal to the diameter of and is adapted to slidably engage the outer surface 20' of the mandrel 20. It is preferred that the inner, cylindrical surface 31' of the retaining ring 31 has a width, in a longitudinal direction, substantially equal to the distance between the barrel stop shoulder 21 and the locking groove 22 on the mandrel surface 20'. This will allow the retaining ring 31 to accomplish various functions as will be described in detail hereinafter and therefore provide a minimum number of elements in the connector.

An elongated locking means 32, preferably cylindrical, is slidably disposed within and carried by the barrel 30. The lower portion of the locking means 32 comprises a plurality of resilient, circumferentially spaced fingers 32a adapted to expand outwardly. Each of the fingers 32a has an inwardly projecting locking head 32b on the end thereof, and all of such locking heads 32b normally being in contact with the retaining ring 31. The locking heads 32b are adapted to be snapped into and out of locking engagement with locking groove 22.

In the normal unexpanded position of the resilient fingers 32a, the diameter of the inner surfaces of the locking heads 32b is less than the diameter of the outer surface 20' of the mandrel 20 and substantially equal to the diameter of the locking groove 22.

Carrier means are rigidly carried within and spaced from the end 30a of the barrel 30 for slidably carrying the elongated locking means 32. Such carrier means 33 is preferably cylindrical and is securely held to the barrel 30 by transverse bolt 34 rotatably provided through the wall of the barrel 30 and received in a circumferential groove 33c on the upper portion 33a of the means 33 for carrying the locking means 32. A longitudinally extending, circumferential sleeve 33b may extend downwardly from the upper portion 33a of such carrier means 33 and may have an outer diameter which is less than the diameter of the inner surface 30' of the barrel 30, thus forming a spring receiving chamber 35 therebetween.

The upper portion 32' of the locking means 32 is adapted to be slidably received within the chamber 35. A coiled spring 36 may be provided within the chamber 35 and is adapted to engage the upper portion 32a of the locking means 32 and, in its normal position, continuously urges the locking means 32 downwardly whereby the locking heads 32b on the spring fingers 32a remain in contact with and engage the outwardly extending retaining ring 31.

The distance between the outer surface 20' of the mandrel 20 and the inner surface 30' of the barrel 30 is slightly greater than the thickness of the locking heads 32b to enable the locking heads to slidingly move therebetween and toward and away from the locking groove 22 during connection and disconnection of the connector device. This is best illustrated in FIG. 5, wherein the spring fingers 32a are fixed outwardly and the locking heads 32b are between the outer mandrel surface 20' and the inner barrel surface 30'.

Fluid sealing means, preferably annular synthetic rings 37, may be provided between the locking means 32, the barrel 30 by means of the carrier means 33, and the mandrel 20 for preventing the fluid from leaking out of the hollow barrel 30 and hollow mandrel 20 when the locking heads 32b are in locking engagement with the locking groove 22 and the barrel and mandrel are connected, as shown in FIG. 6. It is preferred that the fluid sealing rings 37 are provided on and carried by the inner surface of the locking means 32; but it is understood that such fluid sealing means may be provided on the ends of the barrel 30 and mandrel 20 to prevent leakage of fluid.

The connector device of the present invention is unlocked by moving the locking means 32 upward and into the chamber 35 away from the retaining ring 31 and out of the locking groove 22 when the barrel 30 and mandrel 20 are connected. There are various unlocking means that could be provided on the connector device to effectuate this unlocking action.

For example, an outwardly extending lug 38 may be rigidly connected to the locking means 32 by bolts, or the like, 39, such lug 38 having a transverse opening 38a therein. The transversely extending lug 38 is adapted to pass through an opening 40 provided in the wall of the barrel 30 and the upper and lower walls of the opening 40 serve as stops to limit the vertical movement of the lug 38 as well as the vertical movement of the locking means 32 with respect to the barrel 30. It is contemplated that a cable or rod having a hook, such as illustrated by the phantom lines 41 in FIG. 7, may be lowered downwardly into a well hole for engaging the transverse opening 38a in the lug 38. When an upward pull is exerted on such cable 41, the lug 38 and locking means 32 will be moved upwardly into chamber 35 to compress spring 36, thus causing the locking heads 32b to be cammed outwardly and moved upwardly and out of the locking groove 22.

Another unlocking means which may be provided on the connector device of the present invention may be a hydraulic means such as shown by the cylinder 42 and a piston 43 whose end is in engagement with the lug 38. Hydraulic supply pipes 44 (FIG. 8) may be connected to the hydraulic cylinder 42 to supply pressurized fluid for moving the piston 43 outwardly against the transversely extending lug 38, thus causing the locking means 32 to move upwardly into the chamber 35. The same unlocking action of the locking heads 32b from the locking groove 22 will result.

A third means for effectuating the unlocking of the locking heads 32b from the locking groove 22 may be the use of a special unlocking tool shown in FIG. 7 as 45, which is adapted to be lowered downwardly through the drilling equipment and hollow connector device until spring loaded arms 46 slide downwardly beyond the lower end of the cylindrical downwardly extending sleeve 33b on the inside of the mandrel 20 and carrier means 33. The inner surface of the upper portion of the locking means 32 is provided with an inwardly facing circumferential unlocking groove 32' for receiving the outer ends of the spring loaded arms 46 of the unlocking tool 45. As best seen in FIG. 6, when the locking heads 32b are in locking engagement with the locking groove 22, the upper shoulder of the unlocking groove 32' is spaced downwardly from the lower end of the cylindrical sleeve 33b and is adapted to receive the spring loaded arms 46. After the spring loading arms 46 have moved outwardly and into engagement with the unlocking groove 32' (FIG. 7), an upward pull on the unlocking tool 45 will move the locking means 32 upwardly into the chamber 35, causing the locking heads 32b to be removed from the locking groove 22.

It is preferred that the retaining means 31, locking heads 32b and locking groove 22 have outwardly inclined surfaces at substantially the same angle to allow said locking heads 32b to be cammed outwardly and unlocked from the locking groove 22 when the locking means 32 is moved away from the retaining means 31.

It can thus be understood that the barrel 30 and mandrel 20 of the connector device of the present invention may be easily connected and disconnected in a very simple and expeditious manner without rotation of either of these elements or without rotation of the drilling equipment or of any driving lugs or keys rotating in helical channels or slots.

The connection and disconnection of the connector device of the present invention described in sequential steps is as follows:

As best shown in FIG. 2, the mandrel 20 is normally stationary and the barrel 30 is moved downwardly to be connected to the mandrel element. However, it is contemplated by the present invention that these two elements could be reversed and the barrel 30 could be stationary on the bottom and the mandrel 20 could be moving and in the top position as shown in FIG. 2.

As the barrel 30 moves downwardly by the lowering of the drilling equipment connected to the upper portion of the barrel 30, the downwardly and outwardly extending locating funnel 47 rigidly connected to the lower end 30a of the barrel 30 is adapted to locate the mandrel 20 and guide the barrel 30 into proper registration with the mandrel 20. The inner surface 31' of the retaining ring 31 is adapted to slidingly contact the outer surface 20' of the mandrel 20 as best seen in FIG. 3. The barrel 30 continues downwardly until the lower portions of the locking heads 32b engage the downwardly and outwardly inclined shoulder 23 provided between the outer mandrel surface 20' and the guiding surface 20'' on the extreme upper portion of the mandrel 20. The guiding surface 20' is adapted to guide the locking head 32b and locking fingers 32a downwardly into proper registration with the mandrel 20.

Continued downward movement of the barrel 30 will mometarily cause the retaining ring 31 to move downwardly and separate from the locking heads 32b (FIG. 4) as the locking heads 32b will engage the inclined shoulder 23. Further movement of the barrel 30 in a downward direction will cause the locking means 32 to compress the coiled spring 36 until its functions as a rigid member. Additional downward movement of barrel 30 will cause the locking heads 32b and fingers 32a to expand outwardly and move past the inclined shoulder 23. The compressed coil spring 36 will then expand, forcing the locking heads 32b into reengagement with the retaining ring 31 (see FIG. 5).

Further downward movement of the barrel 30 will cause the complementary stop means, barrel end portion 30a and stop shoulder 21, to engage and thus limit further downward movement of the barrel 30 with respect to the mandrel 20. At this point (FIG. 6), the locking heads 32b will be opposite the locking groove 22 and the spring fingers 32a will resume their normal unflexed position, causing the locking heads 32b to snap inwardly into locking engagement with the locking groove 32. As described above, the width or longitudinal distance of the inner surface 31' of the retaining ring 31 is equal to the distance between the stop 21 on the mandrel and the locking groove 22. Any upward movement or vertical pull or load on the barrel 30 will cause the retaining ring 31 to move upwardly and wedge and further lock the locking heads 32b into contact with the groove 22.

The connector device can only be released or disconnected by maintaining the barrel element 30 in the position shown in FIG. 6, and causing movement of the locking means 32 upwardly into the chamber 35 while the barrel 30 remains stationary (FIG. 7). The locking means 32 is thus required to have relative upward and vertical movement with respect to the barrel 30 during the unlocking operation.

When the locking means 32 is moved upwardly during the unlocking step, by any of the various means shown and described, the lug 38 will engage the top wall of the opening 40 in barrel 30 after the locking heads 32b are removed from engagement with locking groove 22, see FIG. 7. Further, upward movement of the lug 38 and locking means 32 will cause the barrel 30, locking means 32 and lug 38 to move upwardly as a unit.

The connector 13 of the present invention may also be used as a safety joint in a drill string by providing a splined connection or interengaging teeth between the barrel end portion 30a and the mandrel stop shoulder 21. As best seen in FIG. 6, such a splined connection between the mandrel 20 and barrel 30 would allow right or left-hand torque to be applied to the connector 13 causing rotation of the connector and all drill pipe therebelow. However, such torque or rotation would not cause the connector 13 to become unlocked or released. This could only be effected by again moving the locking means 32 upward into chamber 35 and removing the locking heads 32b from locking groove 22.

It can thus be seen that vertical loads or torque applied to the connector 13 will not unlock the device. Moreover, there are no critical elements and parts that are subjected to excessive shearing or turning forces in order to lock the connector device. The connector of the present invention is simple, has a minimum number of parts, and is completely automatic and self-locking.

Obviously, many modifications and variations of the present invention are possible in the light of the above teachings. It is therefore to be understood that within the scope of the appended claims the invention may be practiced otherwise than as specifically described.

I claim:

1. In an automatic connector for oil well drilling, casing and cementing strings including an inner, hollow mandrel having one end slidably received and adapted to be automatically and releasably connected in one end of an elongated, hollow, outer barrel member without rotation of the string or of any elements of the mandrel and barrel member, a provision of:

a hollow mandrel having an outer cylindrical surface, a stop shoulder for the end of a barrel projecting outwardly from said outer cylindrical surface and spaced from the end of said mandrel;

an outwardly facing circumferential locking groove provided in said outer cylindrical surface of said mandrel and spaced between the end of said mandrel and said barrel stop shoulder;

a hollow barrel having an inner cylindrical surface of a diameter greater than the diameter of said outer surface of said mandrel;

an inwardly extending, circumferential locking head retaining ring provided on the inner surface of the end of said barrel, the inner surface of said ring having a diameter substantially equal to the diameter of and adapted to slidably engage said outer surface of said mandrel;

carrier means rigidly carried within and spaced from said one end of said barrel including a longitudinally extending circumferential sleeve having an outer diameter which is less than the diameter of said inner surface of said barrel thereby forming a spring receiving chamber therebetween;

a cylindrical, elongated locking means slidably disposed within said barrel and extending from within said spring receiving chamber to said lock retaining ring;

said locking means including an upper portion slidably received in said chamber and a lower portion comprising a plurality of resilient, circumferentially spaced fingers adapted to expand outwardly, each finger having an inwardly projecting locking head on the end thereof and normally in contact with said retaining ring;

in the normal unexpanded position of said resilient fingers, the inner surfaces of said locking heads have a diameter less than the diameter of said outer surface of said mandrel and substantially equal to the diameter of said locking groove;

a spring retained within said spring receiving chamber and engaging said upper portion of said locking means and urging said locking heads on said spring fingers into engagement with said inwardly extending retaining ring;

unlocking means on said cylindrical locking means for moving said locking means into said chamber against said spring and moving said locking heads away from said retaining ring and out of said locking groove when the barrel and mandrel are connected; and fluid sealing means between said locking means, said barrel and said mandrel for preventing fluid from leaking out of said hollow barrel and hollow mandrel when said locking heads are in locking engagement with said locking groove and said barrel and mandrel are connected;

whereby said barrel member and mandrel are adapted to be connected by relative movement of the mandrel within the barrel so that the spring fingers of said locking means are expanded outwardly until the end of the barrel engages the barrel stop and the locking heads assume their normal position and snap inwardly into locking engagement with said locking groove and are retained therein by said retaining ring.

2. In an automatic connector for oil well drilling, casing and cementing strings including an inner, hollow mandrel having one end slidably received and adapted to be automatically and releasably connected in one end of an elongated, hollow, outer barrel member without rotation of the string or of any elements of the mandrel and barrel member, a provision of:

a hollow mandrel having an outer cylindrical surface and an outwardly facing circumferential locking groove in said outer surface and spaced from the end of said mandrel;

a hollow barrel having an inner cylindrical surface of a greater diameter than the diameter of said outer surface of said mandrel;

cylindrical, elongated locking means slidably disposed within and carried by said barrel and including outwardly expandable, circumferentially spaced, inwardly projecting locking heads adapted to slidably engage said outer surface of said mandrel and lockingly engage said circumferential locking groove;

in the normal unexpanded position of said locking heads the inner surfaces thereof having a diameter less than the diameter of said outer surface of said mandrel and substantially equal to the diameter of said locking groove;

carrier means for slidably carrying said elongated locking means longitudinally within said barrel and having a spring for urging said locking means toward the end of said barrel;

retaining means on the inner surface of said barrel member for holding said locking means within said barrel and in contact with said spring when the mandrel and barrel are disconnected and for retaining said locking heads in locking engagement with said locking groove when the mandrel and barrel are connected;

unlocking means on said cylindrical locking means for moving said locking means away from said retaining means and out of locking engagement with said locking groove when the mandrel and barrel are connected; and fluid sealing means between said locking means, said barrel and said mandrel for preventing fluid from leaking out of said hollow barrel and hollow mandrel when said locking heads are in locking engagement with said locking groove and said barrel and mandrel are connected.

3. In an automatic connector for oil well drilling, casing and cementing strings including an inner, hollow mandrel having one end slidably received and adapted to be automatically and releasably connected in one end of an elongated, hollow, outer barrel member without rotation of the string or of any elements of the mandrel and hollow member, a provision of:

a hollow mandrel having an outer cylindrical surface and an outwardly facing locking groove in said outer surface and spaced from the end of said mandrel;

a hollow barrel having an inner cylindrical surface of a greater diameter than the diameter of said outer surface of said mandrel;

elongated locking means carried by said barrel and including outwardly expandable, inwardly projecting locking heads adapted to slidably engage said outer surface of said mandrel and lockingly engage said locking groove in said mandrel;

spring biased means for carrying said elongated locking means on said barrel and for urging said locking means toward the end of said barrel;

retaining means on said barrel for holding said locking means on said barrel when the mandrel and barrel are disconnected and for retaining said locking heads in locking engagement with said locking groove when the mandrel and barrel are connected;

unlocking means on said elongated locking means for moving said locking means away from said retaining means and out of locking engagement with said locking groove when the mandrel and barrel are connected; and fluid sealing means between said locking means, said barrel and said mandrel for preventing fluid from leaking out of said hollow barrel and hollow mandrel when said locking heads are in locking engagement with said locking groove and said barrel and mandrel are connected.

References Cited by the Examiner

UNITED STATES PATENTS

| | | | |
|---|---|---|---|
| 1,070,885 | 8/1913 | Gentile | 285—317 |
| 2,453,741 | 11/1948 | Bopp | 285—304 |
| 2,806,538 | 9/1957 | Conrad | 285—18 |
| 2,887,124 | 5/1959 | Mehl. | |
| 2,921,634 | 1/1960 | Bloudoff | 285—82 |
| 2,962,096 | 11/1960 | Knox | 285—18 X |
| 3,023,030 | 2/1962 | Torres | 285—316 |
| 3,071,188 | 1/1963 | Raulins | 166—66.5 |
| 3,101,798 | 8/1963 | Wilson | 166—66.5 X |
| 3,115,933 | 12/1963 | Haeber | 166—66.5 |

CARL W. TOMLIN, *Primary Examiner.*